US012613102B2

(12) United States Patent
Hidaka et al.

(10) Patent No.: US 12,613,102 B2
(45) Date of Patent: Apr. 28, 2026

(54) ROUTE GENERATION DEVICE FOR AUTONOMOUS MOBILE BODY

(71) Applicant: HONDA MOTOR CO., LTD., Tokyo (JP)

(72) Inventors: Shintaro Hidaka, Saitama (JP); Takuma Mori, Saitama (JP); Peng Zhang, Saitama (JP); Satoshi Hatori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 17/936,865

(22) Filed: Sep. 30, 2022

(65) Prior Publication Data

US 2024/0118095 A1 Apr. 11, 2024

(51) Int. Cl.
*G01C 21/34* (2006.01)
*B60W 60/00* (2020.01)
*G01C 21/00* (2006.01)

(52) U.S. Cl.
CPC ....... *G01C 21/3461* (2013.01); *B60W 60/001* (2020.02); *G01C 21/3874* (2020.08); *B60W 2552/53* (2020.02)

(58) Field of Classification Search
CPC ........... G01C 21/3461; G01C 21/3874; B60W 60/001; B60W 2552/53
See application file for complete search history.

(56) References Cited

U.S. PATENT DOCUMENTS

| | | | | |
|---|---|---|---|---|
| 10,418,863 B1* | 9/2019 | Jadidian | ................ | H02J 7/0042 |
| 2010/0026555 A1* | 2/2010 | Whittaker | ............ | G05D 1/0278 |
| | | | | 382/224 |
| 2010/0198443 A1* | 8/2010 | Yabushita | ............ | G05D 1/0274 |
| | | | | 701/25 |
| 2019/0113927 A1* | 4/2019 | England | ................ | G06F 16/285 |
| 2019/0163191 A1* | 5/2019 | Sorin | ................... | G05D 1/0274 |
| 2020/0150655 A1* | 5/2020 | Artes | ................... | G05D 1/0016 |
| 2020/0398894 A1* | 12/2020 | Hudecek | ............. | G05D 1/0214 |

FOREIGN PATENT DOCUMENTS

JP          2022111121 A          7/2022

* cited by examiner

*Primary Examiner* — Adam D Tissot
(74) *Attorney, Agent, or Firm* — CKC & Partners Co., LLC

(57) ABSTRACT

A route generation device for an autonomous mobile body 1 is configured to generate a route for the autonomous mobile body 1 based on a cost map of a way serving as the route for the autonomous mobile body 1, the cost map including a plurality of grid cells M1 to M9 into which the cost map is divided. In the cost map, a center of a road RD is assigned with a lower value of cost than an edge zone of the road RD. The route generation device includes a controller that is configured to update the cost map based on a result of detection by an outside recognition device, and generate a route based on the updated cost map.

6 Claims, 12 Drawing Sheets

CONTROLLER — 50

CPU — 51

TRAVEL CONTROLLER — 511

ROUTE GENERATOR — 512

MEMORY — 52

STORAGE — 53

ROUTE GENERATION DEVICE FOR AUTONOMOUS MOBILE BODY

BACKGROUND OF THE INVENTION

Field of the Invention

The present invention relates to a route generation device for an autonomous mobile body.

Related Art

There is a known automatic traveling system for a vehicle capable of both autonomous traveling and manual traveling (see, for example, Japanese Unexamined Patent Application, Publication No. 2022-111121). Such an automatic traveling system causes a vehicle to autonomously travel along a preset route based on position information.

Patent Document 1: Japanese Unexamined Patent Application, Publication No. 2022-111121

SUMMARY OF THE INVENTION

In a limited outdoor area including a semi-outdoor area, such as a construction site, a vehicle capable of autonomously traveling is needed to transport a load from one location to another location. In this case, when there is an obstacle such as materials placed on a way set as a route, it is required for the vehicle conveying a load to appropriately detect the obstacle and generate a route for avoiding the obstacle.

An object of the present invention is to provide a route generation device adapted for an autonomous mobile body for use in a limited outdoor area including a semi-outdoor area, and capable of suitably detecting an obstacle and generating a route for avoiding the obstacle, thereby contributing to improvement of safety.

To achieve the above object, an aspect of the present invention provides a route generation device for an autonomous mobile body (e.g., an autonomous mobile body 1 to be described later) equipped with an outside recognition device (e.g., cameras 11, LIDARs 12, and radars 13 to be described later) that is configured to detect and recognize an outside of the autonomous mobile body. The route generation device is installable on the autonomous mobile body and configured to generate a route for the autonomous mobile body based on a cost map of a way (e.g., a road RD to be described later) serving as the route for the autonomous mobile body, the cost map including a plurality of grid cells (e.g., grid cells M1 to M9 to be described later) into which the cost map is divided. In the cost map, a center of the way is assigned with a lower value of cost than an edge zone of the way. The route generation device includes a controller (e.g., a controller 50 to be described later) configured to update the cost map based on a result of detection by the outside recognition device, and generate a route based on the updated cost map. The controller is configured to control and cause the autonomous mobile body to travel in a zone having a low value of cost in the cost map.

In this case, it is preferable that the controller identifies, based on a result of detection by the outside recognition device, an occupied grid cell that is occupied by an object, and updates the cost map such that the occupied grid cell has a maximum value of cost in the updated cost map.

In this case, it is preferable that the controller updates the cost map such that the edge zone of the way and the occupied grid cell have the maximum value of cost in the updated cost map, and generates a route while defining the occupied grid cell having the maximum value of cost as a no-entry zone.

In this case, it is preferable that the controller identifies, based on a result of detection by the outside recognition device, an occupied grid cell that is occupied by an object, and updates the cost map such that a value of cost to be added gradually decreases as a distance from the occupied grid cell increases in the updated cost map.

In this case, it is preferable that in a case where a distance between the grid cells having the maximum value of cost is equal to or greater than a predetermined threshold value, the controller generates a route so as to allow the autonomous mobile body to pass between the grid cells having the maximum value of cost.

In this case, it is preferable that in a case where while the autonomous mobile body is traveling in a widthwise center of a travel lane on the way, if the outside recognition device detects an object (e.g., an obstacle OB to be described later) present eccentrically toward one widthwise side of the travel lane, the controller generates a route so as to cause the autonomous mobile body to travel in a center between an other widthwise side of the travel lane and an edge of the object facing the other widthwise side.

The present invention provides a route generation device adapted for an autonomous mobile body for use in a limited outdoor area including a semi-outdoor area, and capable of suitably detecting an obstacle and generating a route for avoiding the obstacle, thereby contributing to improvement of safety.

BRIEF DESCRIPTION OF THE DRAWINGS

FIG. 7 is a diagram illustrating how an autonomous mobile body avoids an obstacle in a route generated by a route generation device according to an embodiment of the present invention;

DETAILED DESCRIPTION OF THE INVENTION

Embodiments of the present invention will be described below in detail with reference to the accompanying drawings. An autonomous mobile body 1 according to the present embodiment is a vehicle configured as an unmanned cart or the like provided with, for example, a load platform. The autonomous mobile body 1 autonomously travels along a road without a driver aboard, in a limited outdoor work area including a semi-outdoor area, such as a construction site, and transports a load from one location to another location. In a case where an obstacle OB or the like is present on a travel route along which the autonomous mobile body 1 is traveling, the autonomous mobile body 1 detects by itself the obstacle OB or the like, generates and updates therein a cost map regarding a route along which the autonomous mobile body 1 is to travel, instead of resorting to guide by means of communication with an external device, and thereby travels while avoiding the obstacle OB.

Figure 1:
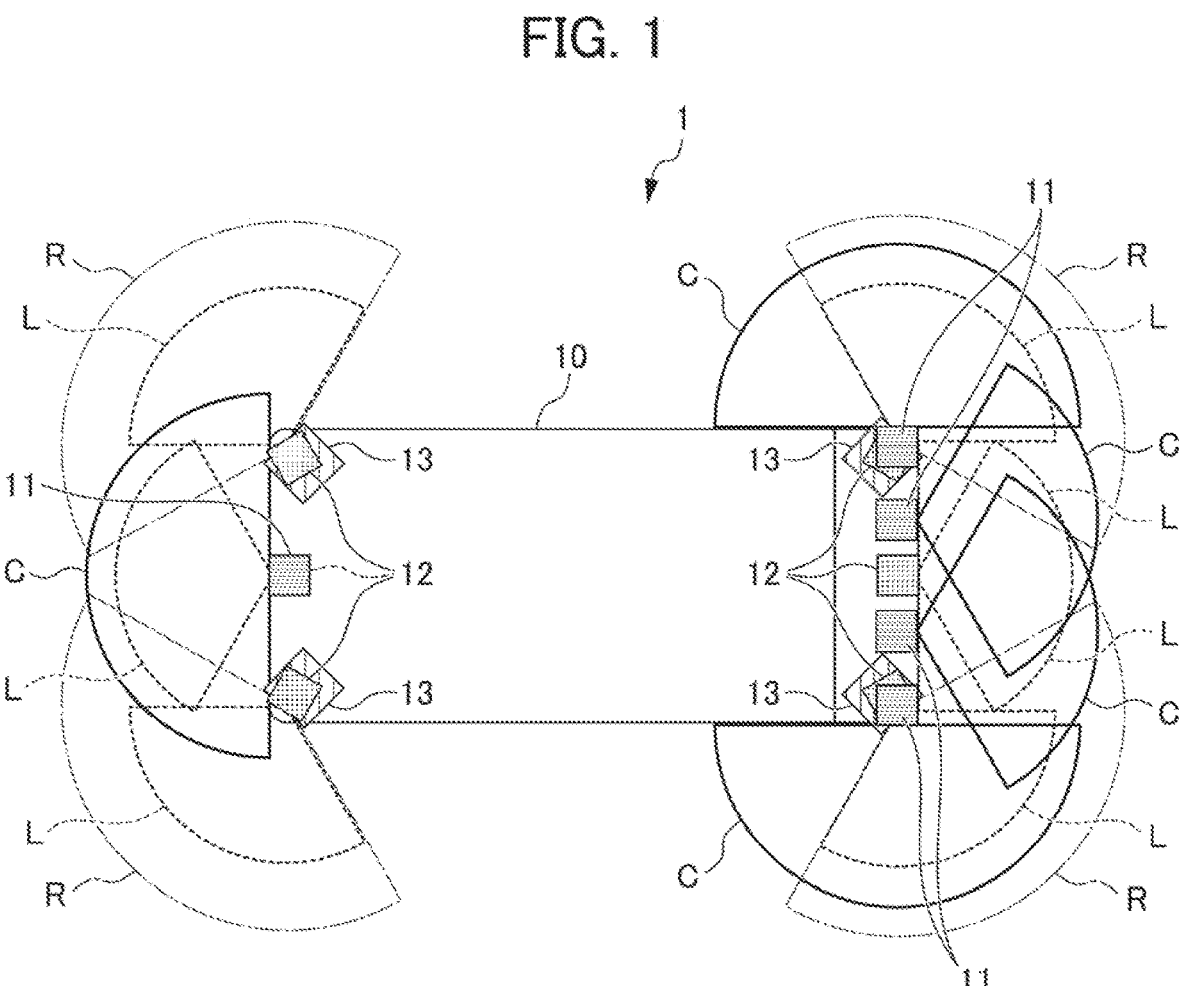
FIG. 1 is a diagram illustrating an autonomous mobile body according to an embodiment of the present invention.
Figure 2:
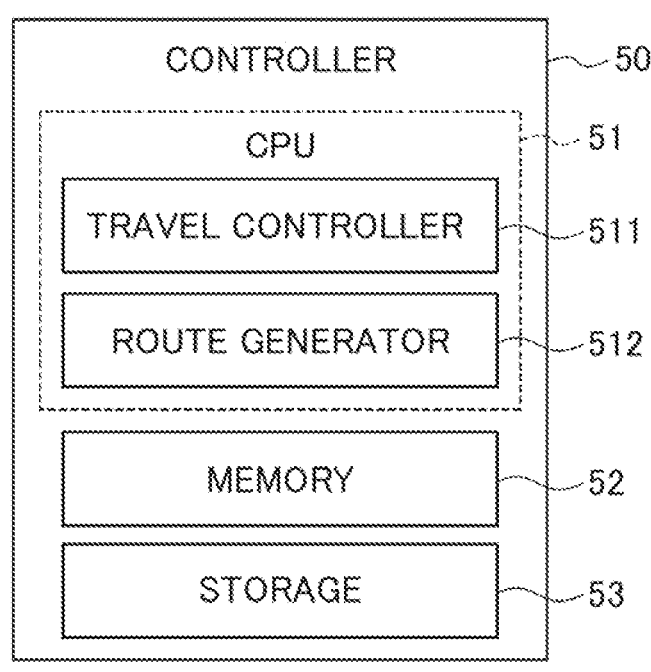
FIG. 2 is a block diagram illustrating a controller forming part of a route generation device for an autonomous mobile body according to an embodiment of the present invention.

As illustrated in FIGS. 1 and 2, the autonomous mobile body 1 includes a vehicle body 10 having a rectangular shape in plan view, and a controller 50 provided to the vehicle body 10. In FIG. 1, a front end portion and a rear end portion of the vehicle body 10 are depicted as the right end portion and the left end portion, respectively. The front end portion and the rear end portion of the vehicle body 10 are both provided with cameras 11, LIDARs (Light Detection and Ranging) 12, and radars 13 that function as outside recognition devices for detecting and recognizing an outside of the vehicle body 10. The vehicle body 10 further includes a GPS device (not shown).

The vehicle body 10 includes, for example, a frame that forms a skeleton of the autonomous mobile body 1, and an outer jacket that covers a space defined by the frame.

A travel unit has a function of causing the autonomous mobile body 1 to travel according to a cost map regarding a route that is generated and updated by a route generator 512 to be described later. The travel unit is mounted to the vehicle body 10, and includes wheels (not shown) and a motor (not shown). The wheels are rotatably supported on the right and left ends of front and rear portions of the autonomous mobile body 1 and include drive wheels and driven wheels. The motor drives the drive wheels.

The cameras 11 include two cameras 11 installed at the right and left ends of the front portion, two cameras 11 installed at positions near the center of the front portion of the vehicle body 10 (i.e., four cameras 11 in total at the front portion), and one camera 11 installed at the center of the rear portion of the vehicle body 10, and detect an obstacle OB present in directions C shown in FIG. 1.

The LIDARs 12 include LIDARs 12 each installed at the right and left ends and the center of the front portion of the vehicle body 10 (i.e., three LIDARs 12 in total at the front portion), and LIDARs 12 each installed at the right and left ends and the center of the rear portion of the vehicle body 10 (i.e., three LIDARs 12 in total at the rear portion), and detect an obstacle OB present in directions L shown in FIG. 1.

The radars 13 include radars 13 each installed at the right and left ends of the front portion of the vehicle body 10 (i.e., two radars 13 in total at the front portion), and radars 13 each installed at the right and left ends of the rear portion of the vehicle body 10 (i.e., two radars 13 in total at the rear portion), and detect an obstacle OB present in directions R shown in FIG. 1. The cameras 11, the LIDARs 12, and the radars 13 are electrically connected to the controller 50, and output, upon detecting the obstacle OB, a detection signal to the controller 50.

As illustrated in FIG. 2, the controller 50 is an electronic control unit (ECU) including a central processing unit (CPU) 51, a memory 52, and a storage 53. The CPU 51 controls various components of the autonomous mobile body 1 by developing a program, which is stored in the storage 53, in the memory 52 and executing the program. The functions of the controller 50 may be implemented by a semiconductor integrated circuit such as a programmable logic device (PLD) or an application specific integrated circuit (ASIC), or may be implemented by software. In other words, the functions of the controller 50 can be implemented by either hardware or software.

The CPU 51 functions as a travel controller 511 and a route generator 512. For example, when functioning as the route generator 512, the CPU 51 generates and updates a cost map regarding a route along which the autonomous mobile body 1 is to travel, based on information regarding an obstacle OB or the like detected by the cameras 11, the LIDARs 12, and the radars 13. Further, the CPU 51 functions as the travel controller 511 to control the travel unit, and thereby causes the autonomous mobile body 1 to travel according to the generated and updated cost map regarding the route. Thus, a function of autonomously traveling along a road without a driver aboard while avoiding an obstacle OB, and transporting a load from one location to another location is achieved in a work area.

Figure 3:
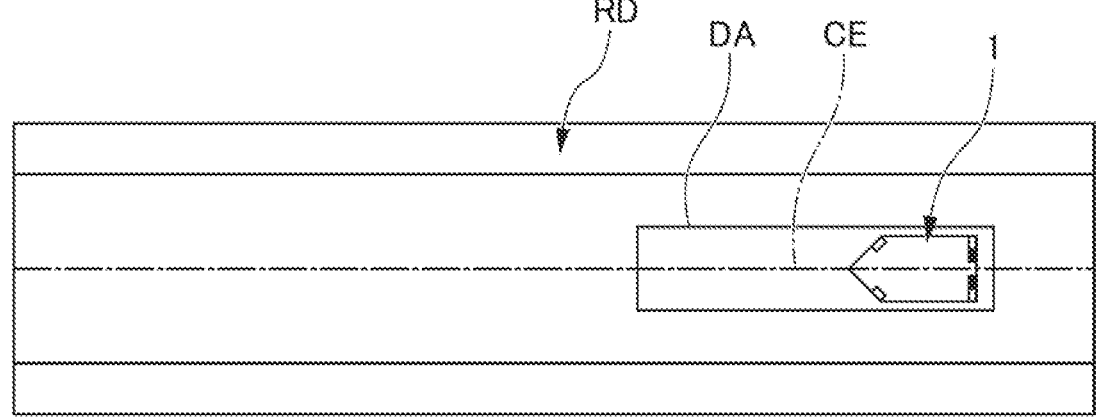
FIG. 3 is a diagram illustrating a detection range within which an obstacle can be detected by an autonomous mobile body according to an embodiment of the present invention.

The storage 53 stores in advance a map of a route in the work area and a cost map corresponding to the map. As illustrated in FIG. 3, the map includes a road RD in which a broken line CE is written at the center of a lane for the autonomous mobile body 1 to travel. When the position of the autonomous mobile body 1 is specified by the GPS device (not shown), and the obstacle OB is not detected on the route, the travel controller 511 controls the travel unit so as to cause the autonomous mobile body 1 to travel on the line CE indicated by the broken line along the route in the map. As illustrated in, for example, FIG. 14, the cost map corresponding to the map includes a plurality of square grid cells M1 to M9 which are arranged in a grid pattern and into which the cost map is divided. The cost map is stored in the storage 53. In FIGS. 3, 7 to 14, and 16 to 19, in order to indicate the traveling direction of the autonomous mobile body 1, the autonomous mobile body 1 is depicted as a pentagon, which corresponds to the original rectangular shape whose short side ahead in the traveling direction is deformed to protrude.

Figure 4:
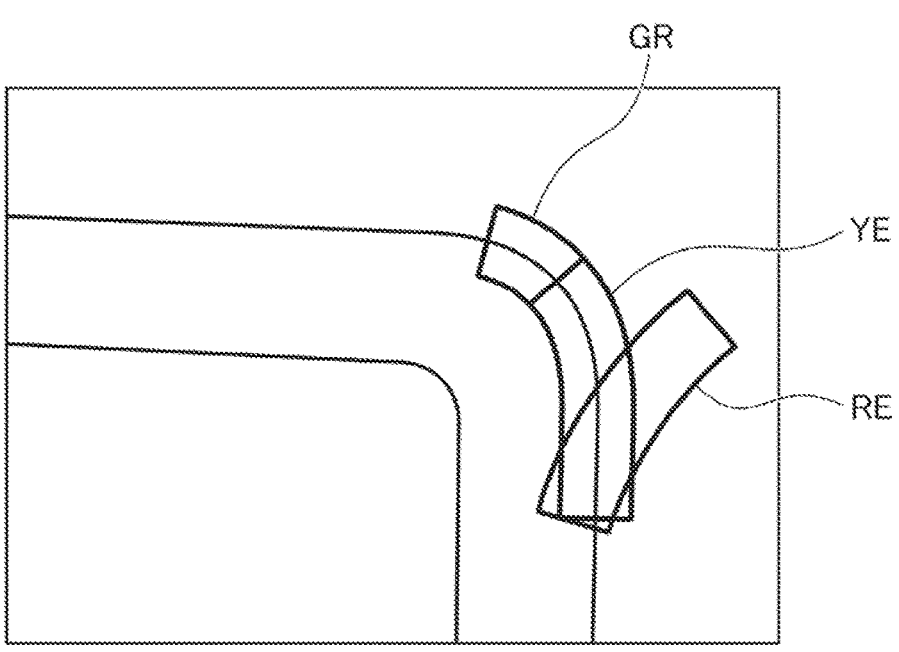
FIG. 4 is a diagram illustrating a plurality of detection ranges within which an obstacle can be detected by an autonomous mobile body according to an embodiment of the present invention.
Figure 5:
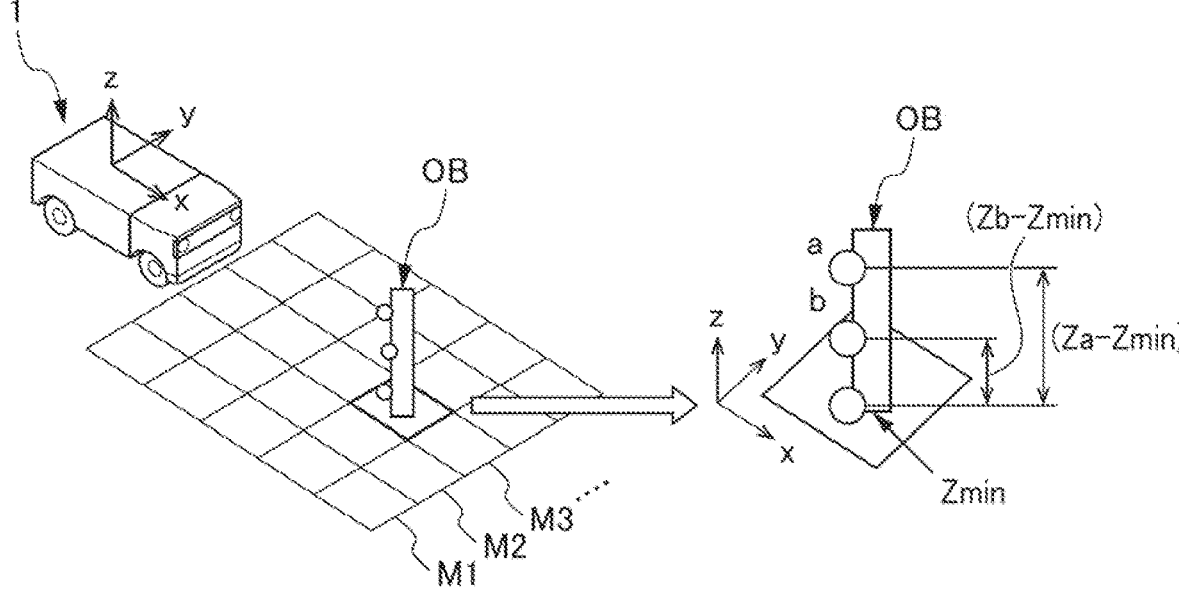
FIG. 5 is a diagram illustrating a manner in which an autonomous mobile body according to an embodiment of the present invention determines an obstacle.

Next, detection of an obstacle OB by the route generator 512 will be described. As illustrated FIG. 3, the autonomous mobile body 1 detects an obstacle OB within a detection range DA that is a region along the line CE in the map. In a case where no obstacle OB is present on the route along which the autonomous mobile body 1 travels, an operation for detecting an obstacle OB is performed while a long-distance detection range GR show in FIG. 4 is set as at detection range DA. The long-distance detection range GR extends along the line CE and is a range where the detection operation is performed up to a far position in front of the autonomous mobile body 1. In a case where an obstacle OB is detected to be present in the long-distance detection range GR, an operation for detecting the obstacle OB is performed while a short-distance detection range YE is set as the detection range DA. The short-distance detection range YE extends along the line CE and is a range where the detection operation is performed up to a relatively close position in front of the autonomous mobile body 1.

At the same time as the operation for detecting the obstacle OB in the long-distance detection range GR or the short-distance detection range YE, an operation for detecting the obstacle OB is performed while a short-distance detection range RE is set as the detection range DA. The short-distance detection range RE extends in a direction in which the autonomous mobile body 1 is oriented and is a range where the detection operation is performed up to a relatively close position in front of the autonomous mobile body 1. The short-distance detection range RE is set as the detection range DA in order to urgently stop the autonomous mobile body 1 when a dynamic obstacle OB suddenly appears immediately in front of the autonomous mobile body 1.

In other words, the long-distance detection range GR and the short-distance detection range YE both have the line CE at the center thereof, whereas the short-distance detection range RE is able to be directed in a direction departing from the line CE but along a direction in which the autonomous mobile body 1 is oriented. In the detection range DA described above, the obstacle OB is detected which occupies one or some of the grid cells M1 to M9 of the cost map to be described later. In each of these detection ranges, the detection operation is performed using the cameras 11, the LIDARs 12, and the radars 13.

When it is detected that one or some of the grid cells M1 to M9 of the cost map are occupied, the controller 50 determines whether or not the occupying object is an obstacle OB in the following manner. When any of the long-distance detection range GR, the short-distance detection range YE, and the short-distance detection range RE shown in FIG. 4 comes to contain any of the occupied grid cells M1 to M9 during traveling of the autonomous mobile body 1, the controller 50 first calculates, for a plurality of upper portions (Za, Zb, etc.) of the occupying object, positional differences from the lowest end portion (Zmin) of the occupying object. If an average value of the positional differences exceeds a predetermined threshold value, the controller 50 determines the occupying object to be an obstacle OB.

Figure 6:
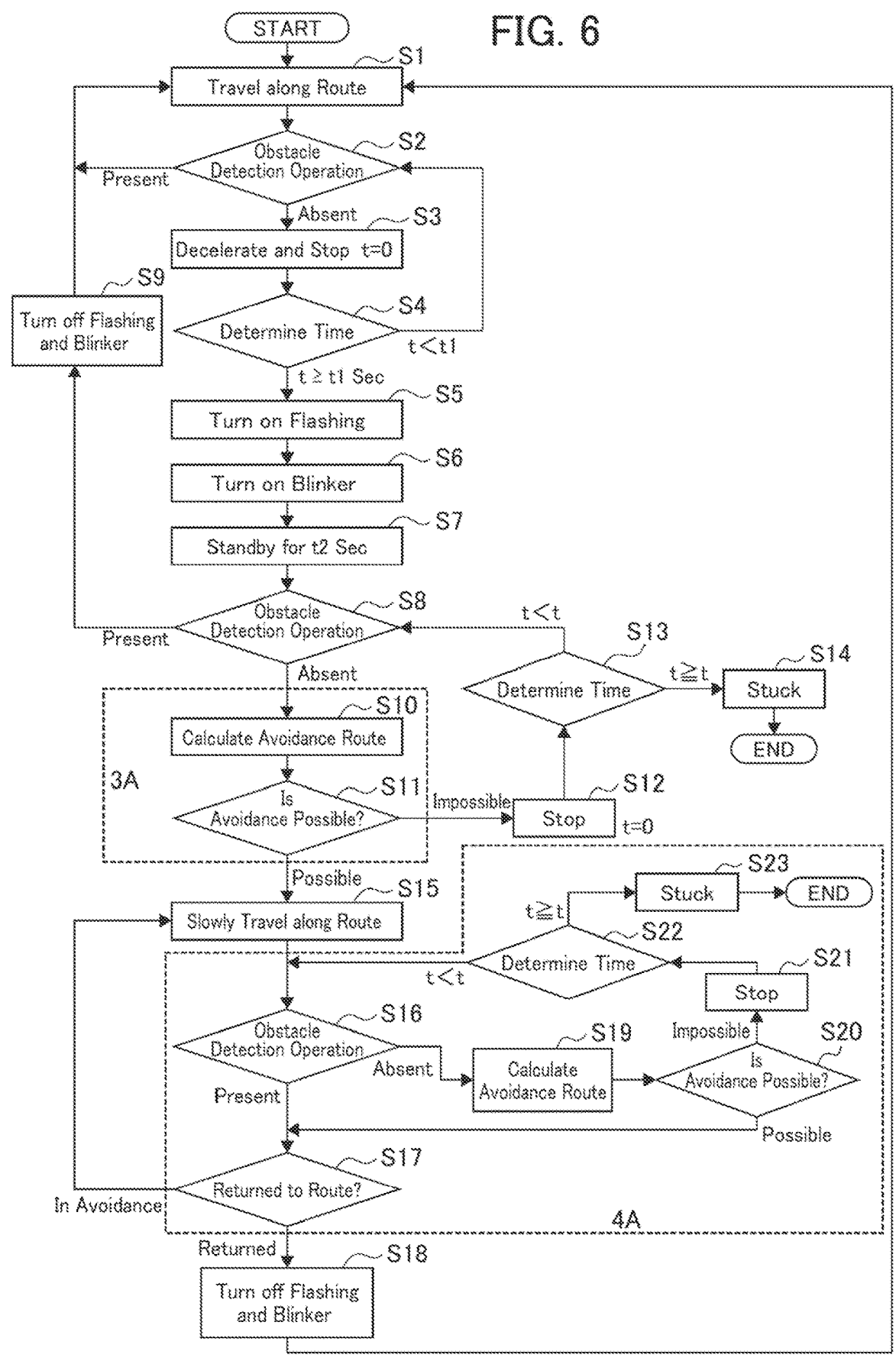
FIG. 6 is a flowchart illustrating control for avoiding an obstacle, performed by a route generation device for an autonomous mobile body according to an embodiment of the present invention.
Figure 7:
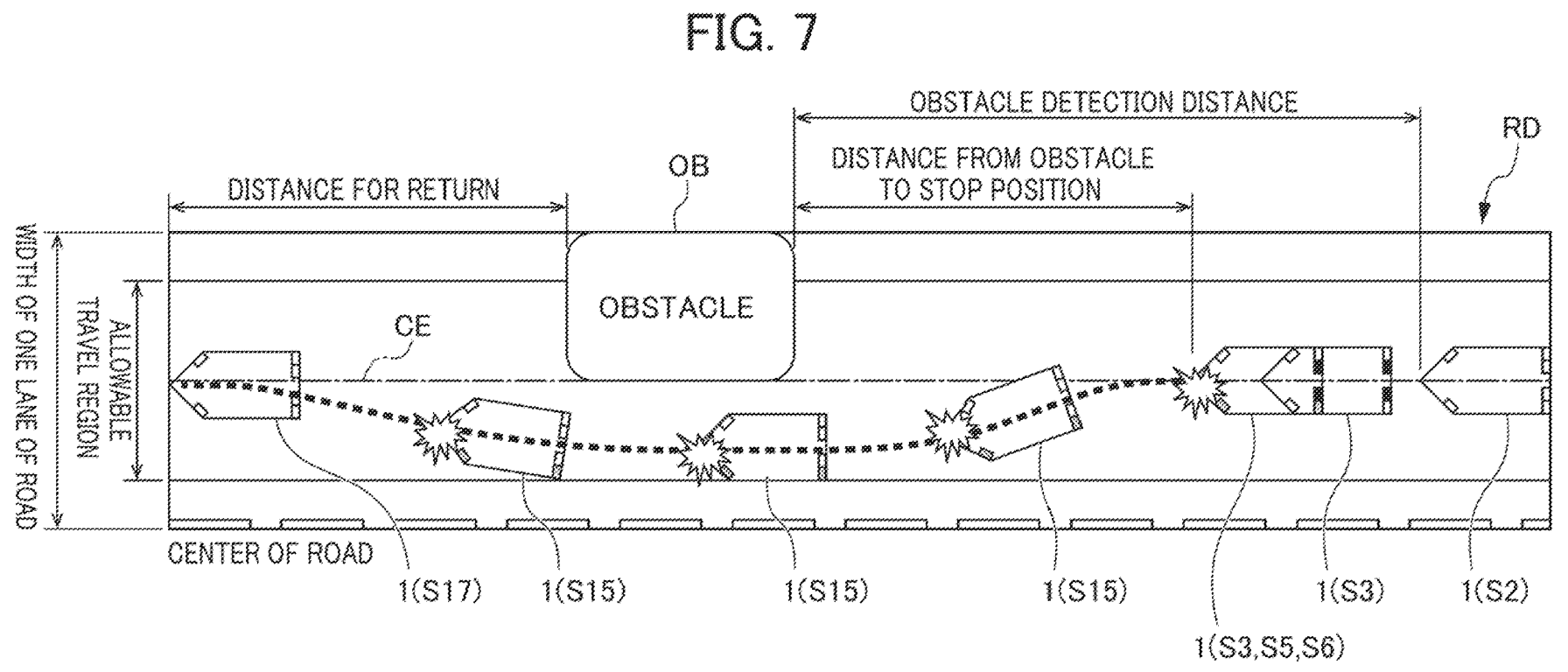
Figure 8:
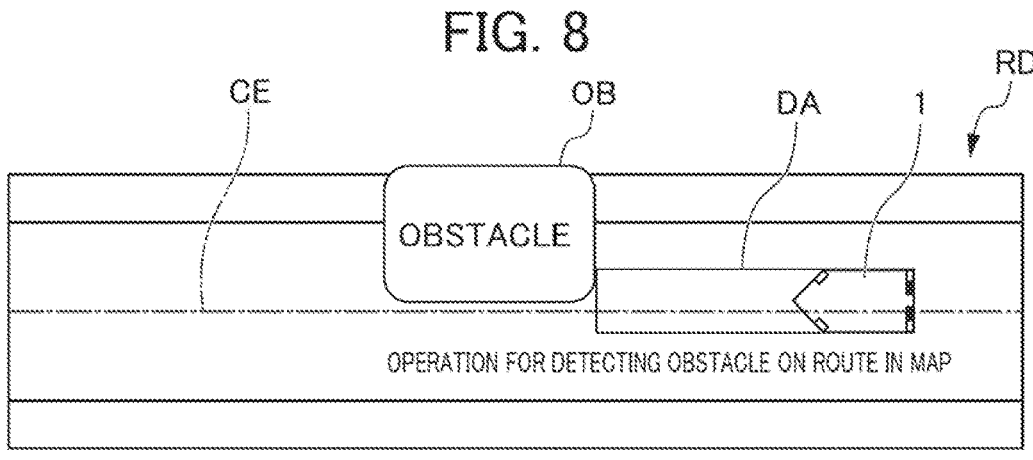
FIG. 8 is a diagram illustrating a state in which an autonomous mobile body according to an embodiment of the present invention has stopped upon detecting an obstacle.
Figure 9:
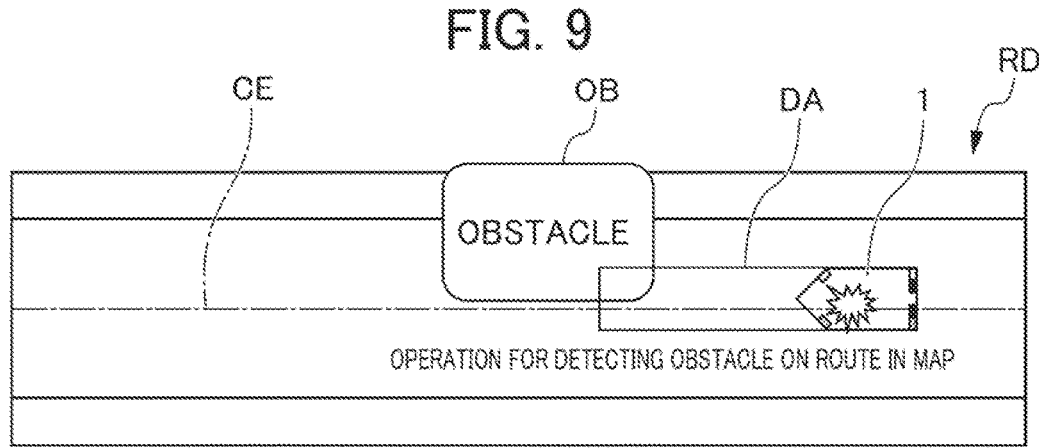
FIG. 9 is a diagram illustrating a state in which the autonomous mobile body according to the embodiment of the present invention starts flashing and blinking a blinker after stopping upon detecting the obstacle.
Figure 10:
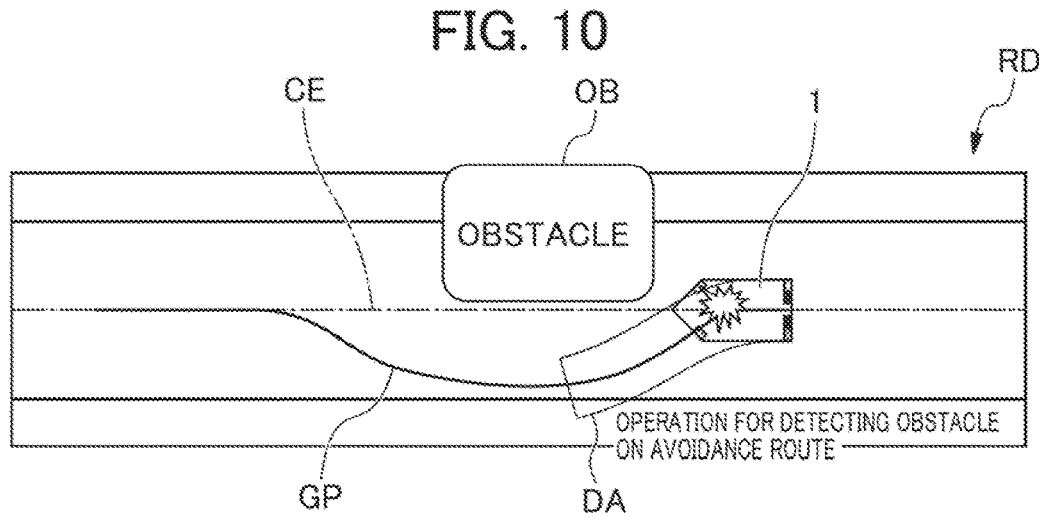
FIG. 10 is a diagram illustrating a state in which the autonomous mobile body according to the embodiment of the present invention generates a route as a global path for avoiding the obstacle.

Next, control on the movement of the autonomous mobile body 1 in a case where the autonomous mobile body 1 detects the obstacle OB will be described in line with the flowchart of FIG. 6 and with reference to FIGS. 7 to 13. As illustrated in FIG. 6, in Step S1, the controller 50 controls the travel unit so as to cause the autonomous mobile body 1 to travel along a route preset in the map stored in the storage 53. The controller 50 then proceeds to Step S2 of the process.

In Step S2, the controller 50 determines whether an obstacle OB is present or absent on the route. Upon determining that the obstacle OB is present ("Present" in Step S2; see FIG. 8), the controller 50 proceeds to Step S3 of the process. Upon determining that the obstacle OB is absent ("Absent" in Step S2), the controller 50 returns to Step S1 of the process.

In Step S3, the controller 50 controls the travel unit so as to cause the autonomous mobile body 1 to decelerate and stop at a predetermined distance before the obstacle OB. The controller 50 then proceeds to Step S4 of the process.

In Step S4, the controller 50 determines whether or not a predetermined time t1 has elapsed. Upon determining that the predetermined time t1 has elapsed (t≥t1 in Step S4), the controller 50 proceeds to Step S5 of the process. Upon determining that the predetermined time t1 has not yet elapsed (t<t1 in Step S4), the controller 50 returns to Step S2 of the process.

In Step S5, the controller 50 controls the travel unit so as to cause the autonomous mobile body 1 to start flashing. The controller 50 then proceeds to Step S6 of the process. In Step S6, the controller 50 controls the travel unit so as to cause the autonomous mobile body 1 to blink a blinker (see FIG. 9). The controller 50 then proceeds to Step S7 of the process. In Step S7, the controller 50 controls the travel unit so as to cause the autonomous mobile body 1 to stop at a standstill for a predetermined time t2. The controller 50 then proceeds to Step S8 of the process.

In Step S8, the controller 50 determines whether an obstacle OB is present or absent. Upon determining that the obstacle OB is present ("Present" in Step S8), the controller 50 proceeds to Step S10 of the process. Upon determining that the obstacle OB is absent ("Absent" in Step S8), the controller 50 proceeds to Step S9 of the process.

In Step S9, the controller 50 controls the travel unit so as to cause the autonomous mobile body 1 to stop flashing and blinking the blinker. The controller 50 then returns to Step S1 of the process.

In Step S10, the controller 50 performs calculation to generate a global path GP that is a relatively long avoidance route along which the autonomous mobile body 1 travels while avoiding the obstacle OB, based on at least one of the cost map, the current position of the autonomous mobile body 1, or a simple characteristic of the autonomous mobile body 1 such as a turning clearance radius. Further, the controller 50 performs calculation to generate a local path LP that is a relatively short avoidance route, based on the global path GP (see FIGS. 10 and 11). The global path GP is calculated in a first predetermined cycle to be continuously updated, while the local path LP is calculated in a second predetermined cycle shorter than the first predetermined cycle to be continuously updated. Generation of the avoidance route will be described later. The controller 50 then proceeds to Step S11 of the process. In Step S11, the controller 50 determines whether or not avoidance of the obstacle OB is possible. Upon determining that avoidance of the obstacle OB is possible ("Possible" in Step S11), the controller 50 proceeds to Step S15 of the process. Upon determining that avoidance of the obstacle OB is impossible ("Impossible" in Step S11), the controller 50 proceeds to Step S12 of the process.

In Step S12, the controller 50 controls the travel unit so as to stop the autonomous mobile body 1, and starts measuring time t with a timer. The controller 50 then proceeds to Step S13 of the process.

In Step S13, the controller 50 determines whether or not the measured time t is equal to or longer than a predetermined time t*. Upon determining that the measured time t is equal to or longer than a predetermined time t*(t≥t* in Step S13), the controller 50 proceeds to Step S14 of the process. Upon determining that the measured time t is less than a predetermined time t*(t<t* in Step S13), the controller 50 returns to Step S8 of the process. In Step S14, the controller 50 performs predetermined processing to notify that the autonomous mobile body 1 is stuck. The controller 50 then ends the process.

Figure 11:
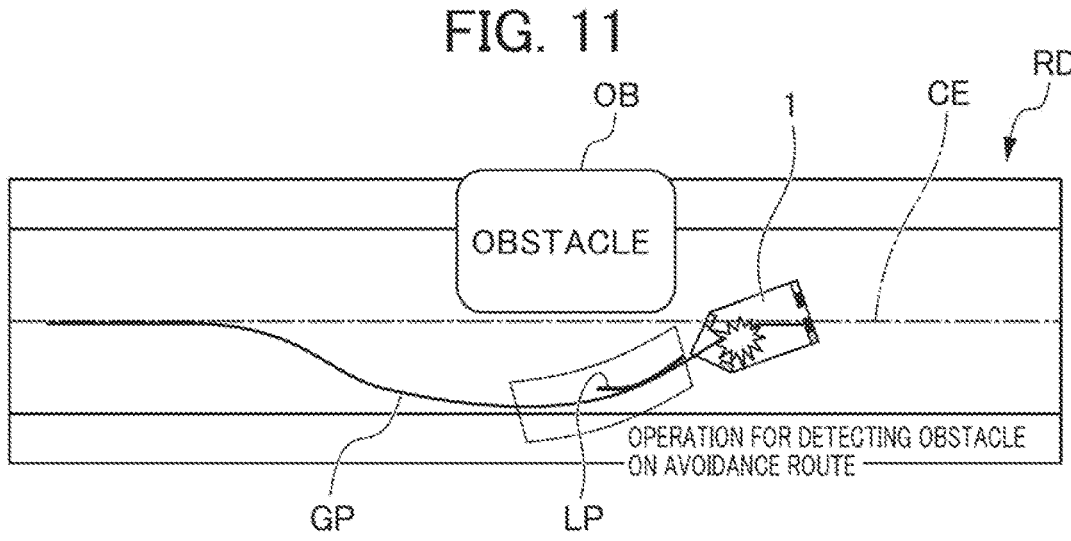
FIG. 11 is a diagram illustrating a state in which the autonomous mobile body according to the embodiment of the present invention generates a route as a local path, in addition to the route as the global path for avoiding the obstacle.
Figure 12:
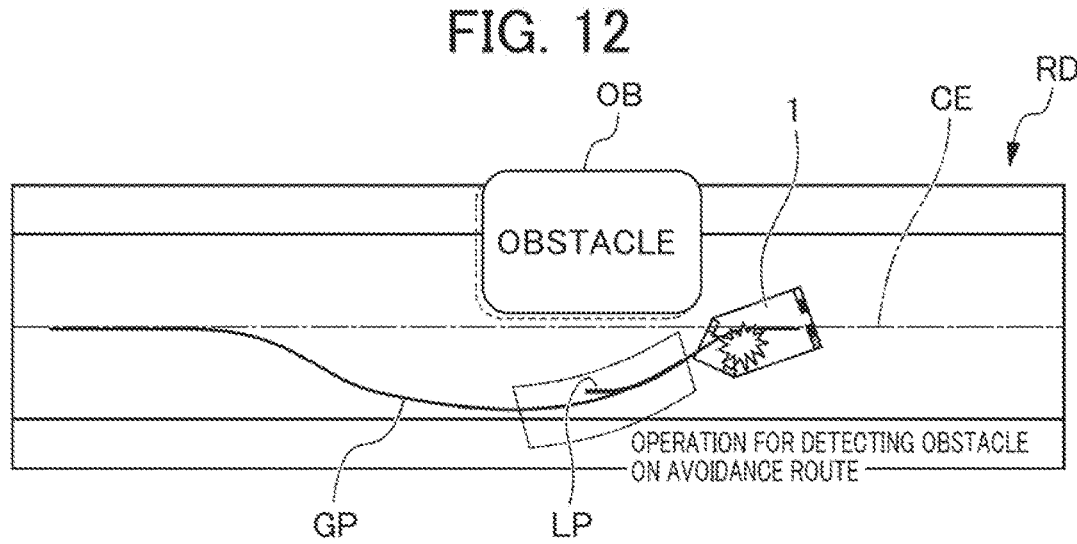
FIG. 12 is a diagram illustrating a state in which the autonomous mobile body according to the embodiment of the present invention detects a dynamic obstacle.
Figure 13:
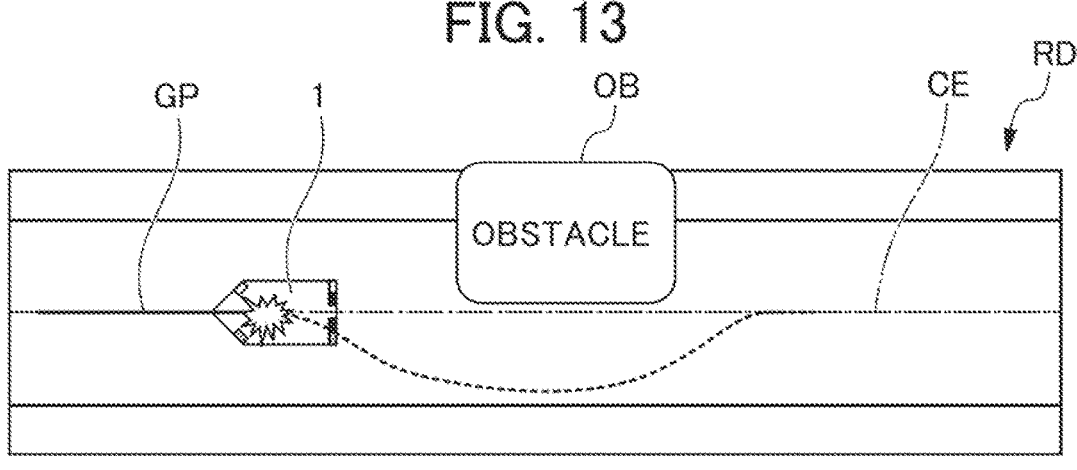
FIG. 13 is a diagram illustrating a state in which the autonomous mobile body according to the embodiment of the present invention has completed avoidance of the obstacle.

In Step S15, the controller 50 controls the travel unit so as to cause the autonomous mobile body 1 to travel slowly along the avoidance route generated in Step S10 (see FIG. 11). In a case where the obstacle OB is not a static obstacle but a dynamic obstacle, in response to ingress of the dynamic obstacle OB into the short-distance detection range RE shown in FIG. 4, the controller 50 performs interruption processing and controls the travel unit so as to stop the autonomous mobile body 1 before the dynamic obstacle OB (see FIG. 12). The controller 50 then proceeds to Step S16 of the process.

In Step S16, the controller 50 determines whether an obstacle OB is present or absent. Upon determining that the obstacle OB is present ("Present" in Step S16), the controller 50 proceeds to Step S19 of the process. Upon determining that the obstacle OB is absent ("Absent" in Step S16), the controller 50 proceeds to Step S17 of the process.

In Step S19, the controller 50 performs calculation to generate an avoidance route along which the autonomous mobile body 1 travels while avoiding the obstacle OB. Generation of the avoidance route will be described later. The controller 50 then proceeds to Step S20 of the process.

In Step S20, the controller 50 determines whether or not avoidance of the obstacle OB is possible. Upon determining that avoidance of the obstacle OB is possible ("Possible" in Step S20), the controller 50 proceeds to Step S17 of the process. Upon determining that avoidance of the obstacle OB is impossible ("Impossible" in Step S20), the controller 50 proceeds to Step S21 of the process.

In Step S21, the controller 50 controls the travel unit so as to stop the autonomous mobile body 1, and starts measuring time t with a timer. The controller 50 then proceeds to Step S22 of the process.

In Step S22, the controller 50 determines whether or not the measured time t is equal to or longer than a predetermined time t*. Upon determining that the measured time t is equal to or longer than a predetermined time t*(t≥t* in Step S22), the controller 50 proceeds to Step S23 of the process. Upon determining that the measured time t is less than a predetermined time t*(t<t* in Step S22), the controller 50 returns to Step S16 of the process. In Step S23, the controller 50 performs predetermined processing to notify that the autonomous mobile body 1 is stuck. The controller 50 then ends the process.

In Step S17, the controller 50 determines whether or not the autonomous mobile body 1 has returned from the avoidance route for avoiding the obstacle OB to the route stored in the map. Upon determining that the autonomous mobile body 1 has returned from the avoidance route for avoiding the obstacle OB to the route stored in the map ("Returned" in Step S17), the controller 50 proceeds to Step S18 of the process (see FIG. 13). Upon determining that the autonomous mobile body 1 is traveling on the avoidance route for avoiding the obstacle OB ("In Avoidance" in Step S17), the controller 50 returns to Step S15.

In Step S18, the controller 50 controls the travel unit so as to cause the autonomous mobile body 1 to stop flashing and blinking the blinker. The controller 50 then returns to Step S1 of the process.

Next, calculation processing that the route generator 512 of the controller 50 performs to generate the avoidance route along which the autonomous mobile body 1 avoids the obstacle OB. In this processing, the route generator 512 updates the cost map based on detection results from the outside recognition devices such as the cameras 11, and generates the avoidance route for avoiding the obstacle OB based on the updated cost map. The autonomous mobile body 1 then travels through grid cells having the lowest value of cost in the cost map.

Figure 14:
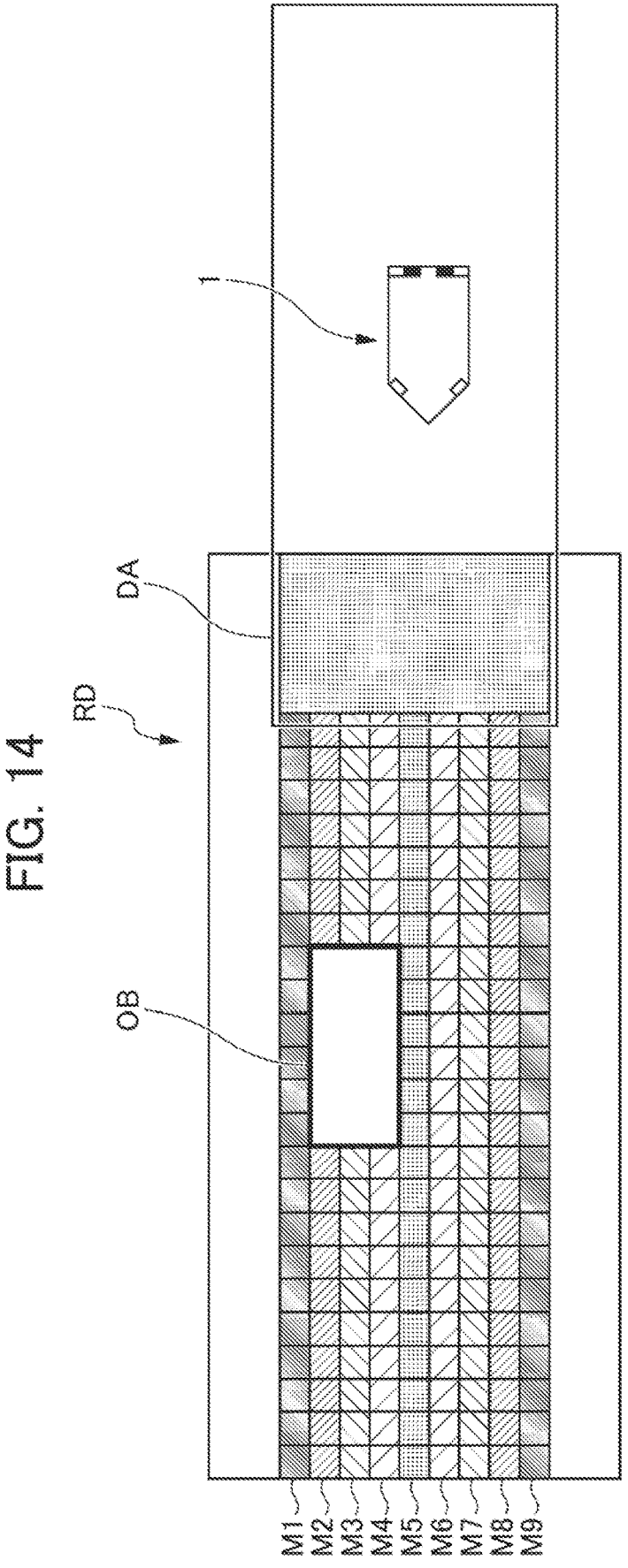
FIG. 14 is a diagram illustrating a cost map and a detection range within which an autonomous mobile body according to an embodiment of the present invention can detect an obstacle.

Specifically, as illustrated in, for example, FIG. 14, the cost map stored in the storage 53 includes a plurality of square grid cells M1 to M9 arranged in a plurality of rows and columns in a grid pattern. Each of the grid cells M1 to M9 is assigned with a value of cost. In a case where an obstacle OB occupies one or some of the grid cells M1 to M9 on the lane of the road RD that serves as the route along which the autonomous mobile body 1 moves, the route generator 512 of the controller 50 generates an avoidance route for avoiding the obstacle OB by means of the cost map having the values of cost assigned thereto.

Specifically, the values of cost assigned to the cost map are set by the route generator 512 in the following manner. Referring to FIG. 14, the grid cells M1 in the first row from the top and the grid cells M9 in the first row from the bottom correspond to road edge zones as the opposite edge zones of the lane of the road RD serving as the route along which the autonomous mobile body 1 moves, and a value of cost assigned to the grid cells M1 and M9 is set to a maximum value of "4". In FIG. 14, the grid cells M2 in the second row from the top and the grid cells M8 in the second row from the bottom are located closer to the center relative to the opposite edge zones of the lane of the road RD serving as the route along which the autonomous mobile body 1 moves, and a value of cost assigned to the grid cells M2 and M8 is set to "3". In FIG. 14, the grid cells M3 in the third row from the top and the grid cells M7 in the third row from the bottom are located further closer to the center relative to the opposite edge zones of the lane of the road RD serving as the route along which the autonomous mobile body 1 moves, and a value of cost assigned to the grid cells M3 and M7 is set "2". In FIG. 14, the grid cells M4 in the fourth row from the top and the grid cells M6 in the fourth row from the bottom are located still further closer to the center relative to the opposite edge zones of the lane of the road RD serving as the route along which the autonomous mobile body 1 moves, and a value of cost assigned to the grid cells M4 and M6 is set to "1". In FIG. 14, the grid cells M5 in the fifth row from both the top and bottom correspond to the center of the lane of the road RD serving as the route along which the autonomous mobile body 1 moves, and a value of cost assigned to the grid cells M5 is set to a minimum value of "0". The line CE shown in FIG. 3 is positioned at the center of the grid cells M5. That is, in the cost map, as represented by the gradation in FIG. 14, the value of cost gradually decreases in a linear function manner toward the center of the road RD from the opposite edge zones of the road RD.

Figures 15, 16:
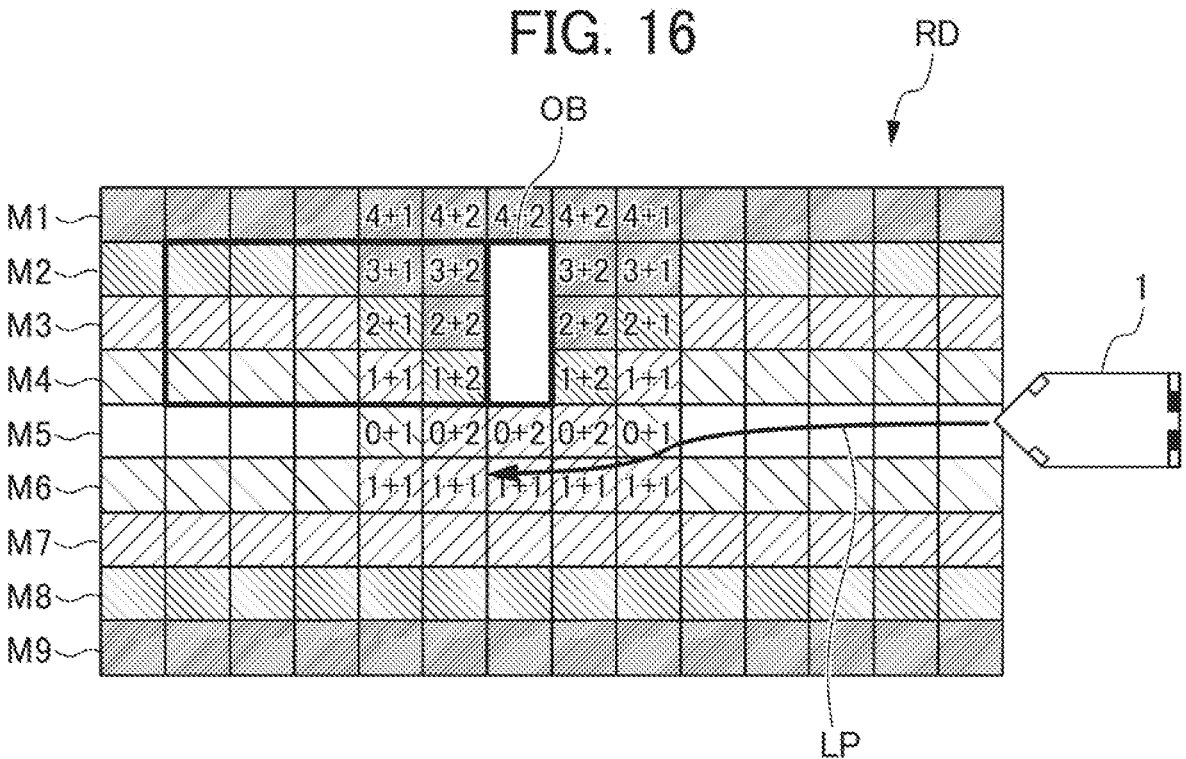
FIG. 15 is a diagram illustrating a cost map showing values of cost around an obstacle to an autonomous mobile body according to an embodiment of the present invention.
FIG. 16 is a diagram illustrating updating of the cost map when an obstacle detection range of the autonomous mobile body according to the embodiment of the present invention begins to contain an obstacle.

In a case where the obstacle OB occupies one or some of the grid cells M1 to M49 of the lane of the road RD serving as the route along which the autonomous mobile body 1 moves, the grid cells M1 to M9 surrounding the obstacle OB are each assigned with the sum of its preset value of cost and an additional value. Specifically, as illustrated in FIG. 15, for the grid cells located around and closest to the obstacle OB, a value of "2" is added to their preset values of cost. For the grid cells located around and second closest to the obstacle OB, a value of "1" is added to their preset values of cost. In the case where the obstacle OB occupies one or more of the grid cells M1 to M9, the route generator 512 of the controller 50 identifies the occupied grid cells (in FIG. 15, the grid cells M2 to M44 where the obstacle OB is positioned). The route generator 512 then sets the value of cost of the occupied grid cells to "4", i.e., the maximum value, and updates the cost map accordingly. That is, the route generator 512 updates the cost map such that the value of cost to be added gradually decreases in a linear function manner as the distance from the grid cells occupied by the obstacle OB increases.

The route generator 512 defines, as a no-entry zone, the grid cells M1 and M9 whose value of cost is set to the maximum value "4" and the grid cells occupied by the obstacle OB, and generates a route such that the autonomous mobile body 1 is prevented from traveling in the off-limits zone.

Figure 17:
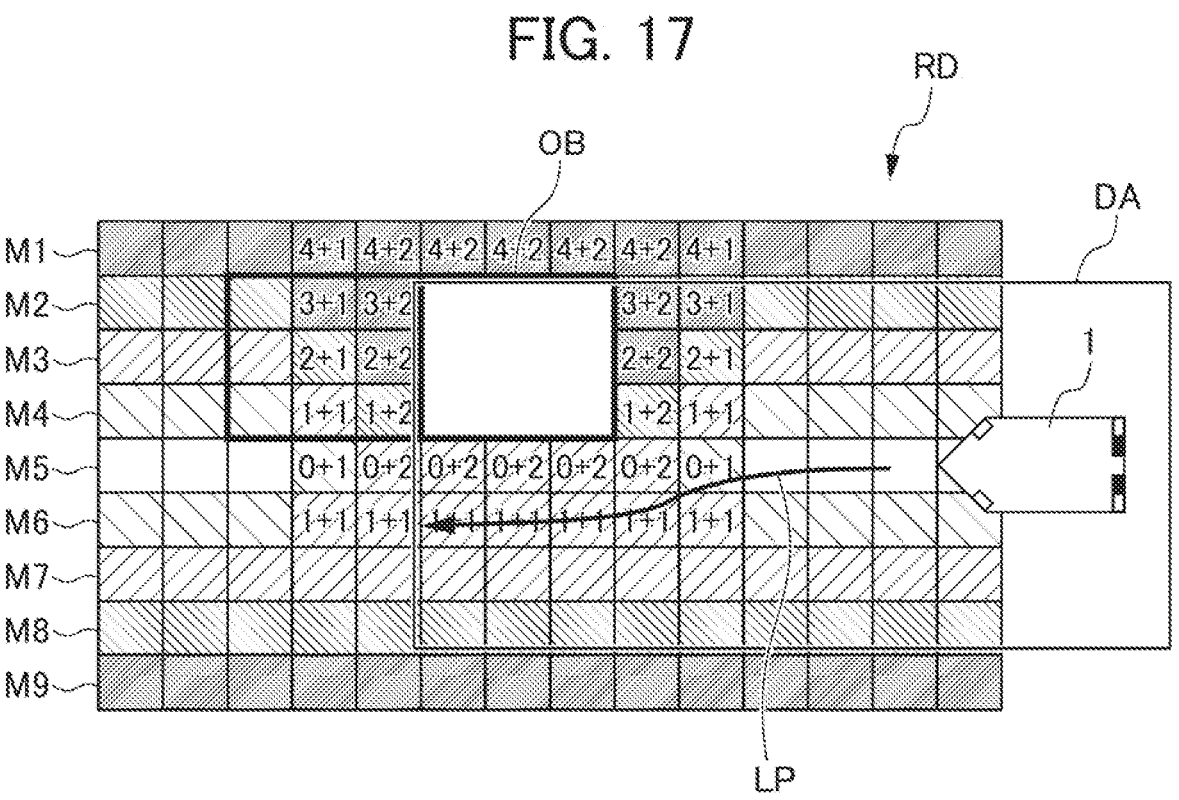
FIG. 17 is a diagram illustrating updating of the cost map when the obstacle detection range of the autonomous mobile body according to the embodiment of the present invention contains about a half of the obstacle.

Based on the cost map of the avoidance route set as described above, the autonomous mobile body 1 first travels on the grid cells M5 at the center between the opposite edge zones of the road, as illustrated in FIGS. 16 and 17. Next, in response to the detection range DA containing the obstacle OB, the values of cost of the grid cells occupied by the obstacle OB and the values of cost of the grid cells around the obstacle OB are updated, and the cost map is then updated. Accordingly, the controller 50 controls the travel unit so as to cause the autonomous mobile body 1, which has traveled along a route as a global path, to travel along a route as an updated local path, based on the updated global path.

Figure 18:
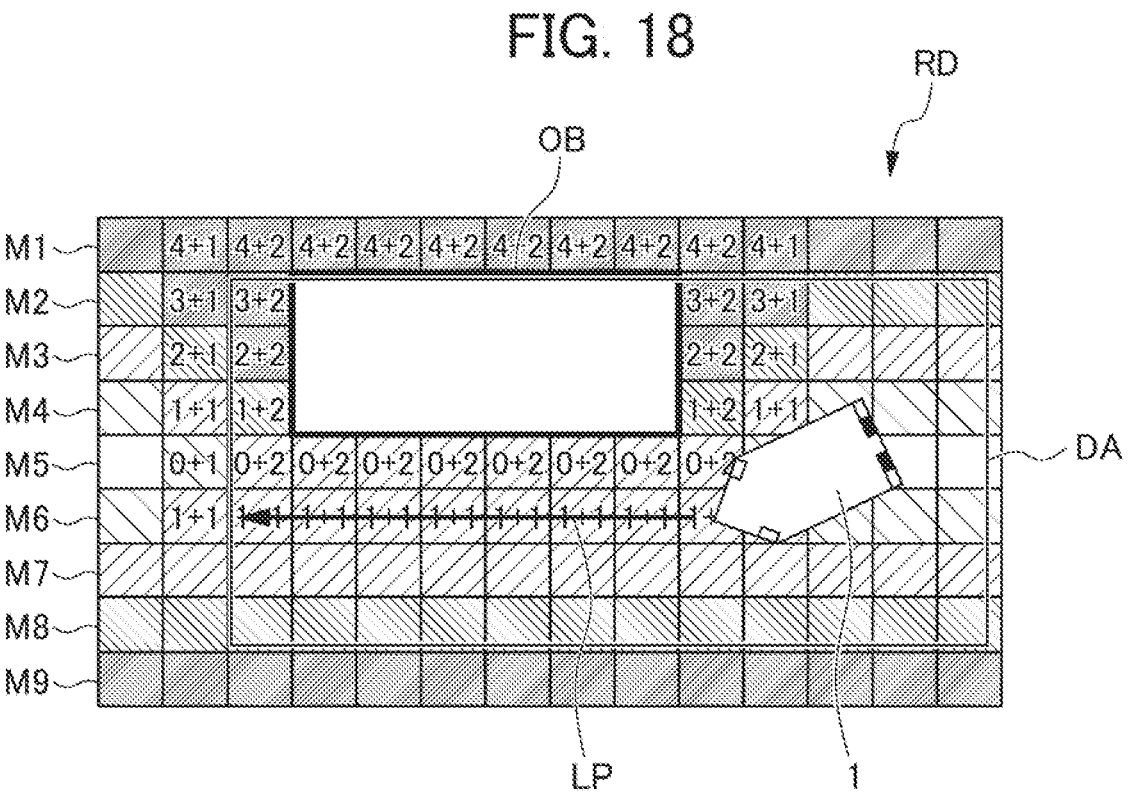
FIG. 18 is a diagram illustrating updating of the cost map when the obstacle detection range of the autonomous mobile body according to the embodiment of the present invention contains the entirety of the obstacle.
Figure 19:
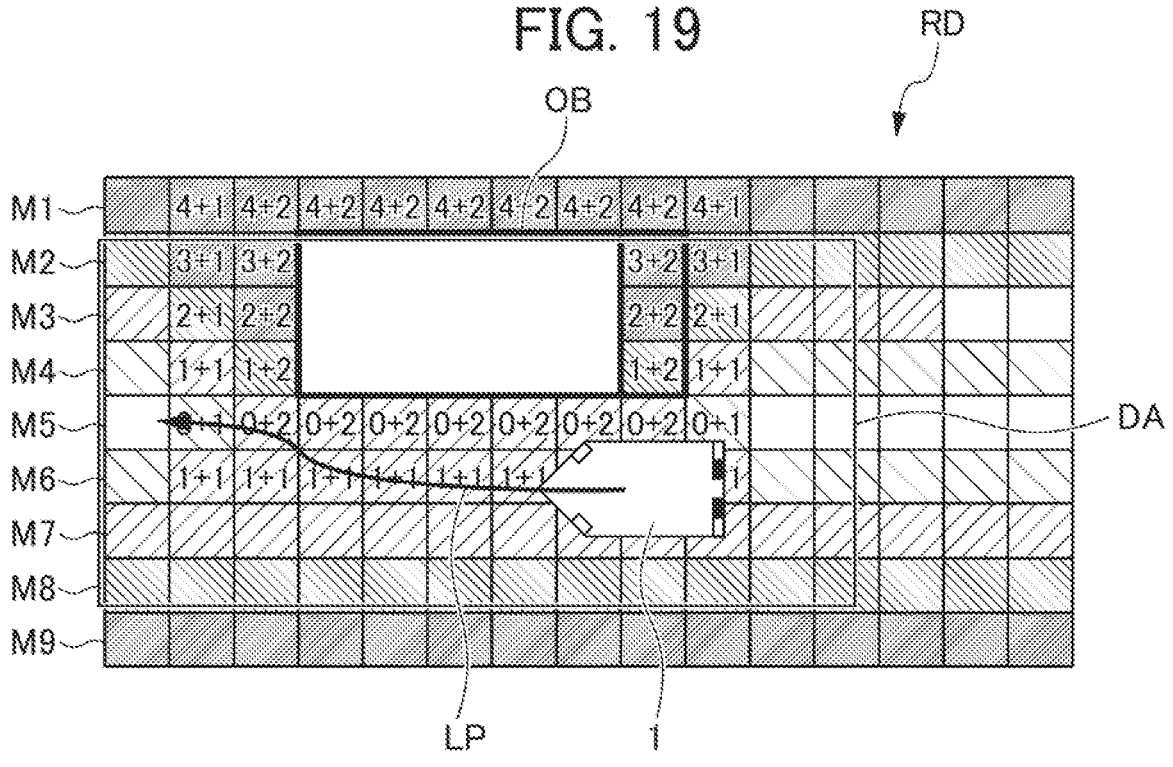
FIG. 19 is a diagram illustrating updating of the cost map when the autonomous mobile body according to the embodiment of the present invention has further advanced while the obstacle detection range contains the entirety of the obstacles.

Specifically, the route as the local path is generated such that the autonomous mobile body 1 is allowed to travel in the center between a set of grid cells M9, which correspond to an edge zone toward the other widthwise side of the road RD as the travel lane, and the lower edge of the obstacle OB shown in FIGS. 16 to 19, which is the edge facing the other widthwise side. Here, the phrase "travel(s) in the center" means not only that the center agrees with the widthwise center of the autonomous mobile body 1, but also that the autonomous mobile body 1 travels while having a portion thereof overlapping with the center, as shown in FIGS. 18 and 19.

As to the generated route, the route generator 512 of the controller 50 determines whether or not the autonomous mobile body 1 can pass between the set of grid cells M9 corresponding to the road edge zone and having the maximum value of cost and the set of grid cells occupied by the obstacle OB. Specifically, in a case where the distance between the set of grid cells M9 corresponding to the road edge zone and the set of grid cells occupied by the obstacle OB is equal to or greater than a predetermined threshold value that is larger than the width of the autonomous mobile body 1, the route generator 512 determines that the autonomous mobile body 1 can pass, and sets the generated route as the avoidance route.

The present embodiment achieves the following effects. According to the present embodiment, the cost map is provided in which the center of the road RD is assigned with a lower value of cost than the road edge zones of the road RD. The present embodiment includes the controller 50 that updates the cost map based on detection results from the outside recognition devices including the cameras 11, the LIDARs 12, and the radars 13, and generates a route based on the updated cost map. The controller 50 controls and causes the autonomous mobile body 1 to travel on grid cells having a low value of cost in the cost map. This feature makes it possible to set, in consideration of avoidance of the obstacle OB, a route that allows the autonomous mobile body 1 to travel in the center of the road RD where a high degree of safety is ensured.

According to the present embodiment, the cost map is updated such that the grid cells occupied by the obstacle OB have the maximum value of cost in the updated cost map. This feature makes it possible to set a route that reliably enables avoidance of the obstacle OB.

According to the present embodiment, the controller 50 updates the cost map such that the grid cells M1 and M9 corresponding to the road edge zones and the grid cells occupied by the obstacle OB have the maximum value of cost in the updated map, and generates a route while defining the occupied grid cells having the maximum value of cost as a no-entry zone. Thus, defining the grid cells occupied by the obstacle OB and the grid cells M1 and M9 corresponding to the road edge zones as the no-entry zone makes it possible to prevent the autonomous mobile body 1 from departing from the own lane and contacting with the obstacle OB.

According to the present embodiment, the cost map is updated such that a value of cost to be added gradually decreases as the distance from the grid cells occupied by the obstacle OB increases. Due to this feature, a value of cost is added to even grid cells that are not occupied by the obstacle OB, making it possible to set a route apart from the obstacle OB by a certain distance. As a result, safety can be ensured even in a case where a dynamic obstacle OB moves suddenly. In addition, in a case where the obstacle OB has a distorted shape, the feature makes it unlikely for the route to be formed along the contour of the distorted shape, making it possible to prevent the autonomous mobile body 1 from rattling.

Furthermore, according to the present embodiment, when a distance between the grid cells having the maximum value of cost is equal to or greater than a predetermined threshold value, the controller 50 generates a route so as to allow the autonomous mobile body 1 to pass between the grid cells having the maximum value of cost. Due to this feature, the route can be set at a certain distance from the grid cells having the maximum value of cost, making it possible to ensure safety more reliably.

Further, according to the present embodiment, in a case in which while the autonomous mobile body 1 is traveling in the widthwise center of the lane on the road RD, if the outside recognition device detects an obstacle OB present eccentrically toward one widthwise side of the lane, the controller 50 generates a route so as to cause the autonomous mobile body 1 to travel in the center between a set of the grid cells M9 corresponding to an edge zone of the lane toward the other widthwise side and an edge of the obstacle OB facing the other widthwise side. This feature makes it possible to generate a route for reliably avoiding the obstacle OB present eccentrically toward one widthwise side of the lane.

Figure 20:
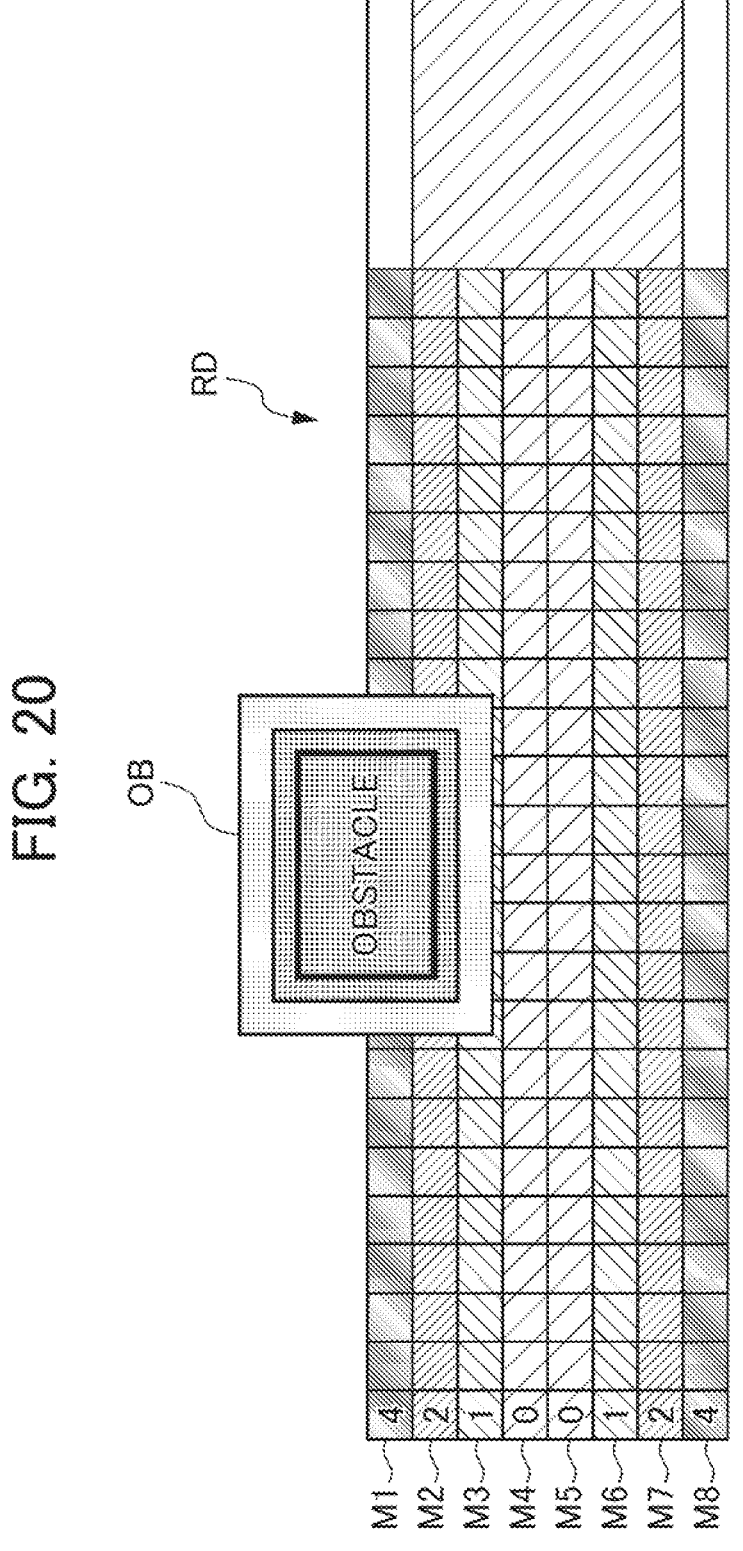
FIG. 20 is a diagram illustrating a cost map showing values of cost set to a road and values of cost around an obstacle to an autonomous mobile body according to a modification of the present invention.

The present invention is not limited to the above embodiment, and various design changes can be made without departing from the spirit of the present invention. For example, in the above embodiment, the cost map is set such that the value of cost gradually decreases in a linear function manner toward the center of the road RD from the edge zones of the road RD. However, the present invention is not limited thereto. For example, as illustrated in FIG. 20, the route generator 512 may set the cost map in which the grid cells M1 and M8 corresponding to the edge zones of the road have a maximum value of "4", and the grid cells M2 and M7 located immediately next to the grid cells M1 and M8 and toward the center have a half value of that of the grid cells M1 and M8, i.e., "2", so that the value of cost sharply decreases in a quadratic function manner. Further, in order to cause the autonomous mobile body 1 to stably travel in the center of the road, a zone where the grid cells have the minimum value of cost may be set to have a large width in the widthwise direction of the road.

In the above embodiment, the route generator 512 updates the cost map by adding a value of cost that gradually decreases in a linear function manner as the distance from the grid cells occupied by the obstacle OB increases. However, the present invention is not limited thereto. For example, the route generator 512 may update the cost map by adding a value of cost that sharply decreases in a quadratic function manner as a distance from the grid cells occupied by the obstacle OB increases.

Further, the configuration of the autonomous mobile body 1 according to the above embodiment is also a non-limiting example. In the above embodiment, the autonomous mobile body 1 is for use to transport a load from one location to another while autonomously traveling along a road without a driver aboard, in a limited outdoor work area including a semi-outdoor area, such as a construction site. However, this is a non-limiting example. Moreover, in the above embodiment, the object is the obstacle OB. The present invention is not limited thereto.

EXPLANATION OF REFERENCE NUMERALS

1: Autonomous mobile body
11: Camera (Outside recognition device)
12: LIDAR (Outside recognition device)
13: Radar (Outside recognition device)
50: Controller
GP: Global path (Route)
LP: Local path (Route)
M1 to M9: Grid cell
OB: Obstacle (Object)
RD: Road (Way)
What is claimed is:
1. A route generation device for an autonomous mobile body equipped with an outside recognition device that is configured to detect and recognize an outside of the autonomous mobile body,
the route generation device being installable on the autonomous mobile body and configured to generate a route for the autonomous mobile body based on a cost map of a road serving as the route for the autonomous mobile body,
the cost map including a plurality of grid cells into which the cost map is divided,
wherein the road is located in a limited outdoor area including a semi-outdoor area,
wherein in the cost map, the road includes a lane on which the autonomous mobile body travels, and has a center of the road and edge zones of the road, the center of the road being located at a center of the lane and having a predetermined line thereon, the edge zones of the road being located on opposite sides of the lane, and
wherein in the cost map, the center of the road is assigned with a lower value of cost than the edge zones of the road,
the route generation device comprising:
a controller configured to update the cost map based on a result of detection by the outside recognition device, and control and cause the autonomous mobile body to travel in a zone having a low value of cost in the cost map updated,
wherein the controller
identifies, based on a result of detection by the outside recognition device, an occupied grid cell that is occupied by an object,
updates the cost map such that the edge zones of the road and the occupied grid cell have a maximum value of cost in the cost map updated,
makes a setting that two or more grid cells adjacent to the occupied grid cell and corresponding to a region that is substantially occupied by the object have the maximum value of cost, in accordance with an outer shape of the object or a ratio of occupancy by the object, and
generates a route while defining the occupied grid cell having the maximum value of cost as a no-entry zone,
in response to determining that a detection range within which the object is detected includes an entirety of the object in a widthwise direction, the controller generates a route while making a setting that all of grid cells occupied by the object have the maximum value of cost and defining the grid cells occupied by the object as the no-entry zone.
2. The route generation device according to claim 1, wherein
the controller
updates the cost map such that a value of cost to be added gradually decreases as a distance from the occupied grid cell increases in the updated cost map.
3. The route generation device according to claim 1, wherein
in response to a distance between the grid cells having the maximum value of cost is equal to or greater than a predetermined threshold value, the controller generates a route so as to allow the autonomous mobile body to pass between the grid cells having the maximum value of cost, and
in response to the distance between the grid cells having the maximum value of cost is less than the predetermined threshold value, the controller generates a route while defining a no-entry zone between the grid cells having the maximum value of cost.
4. The route generation device according to claim 1, wherein
in a case where while the autonomous mobile body is traveling in a widthwise center of a travel lane on the way, if the outside recognition device detects an object present eccentrically toward one widthwise side of the travel lane, the controller generates a route so as to cause the autonomous mobile body to travel in a center between an other widthwise side of the travel lane and an edge of the object facing the other widthwise side, and in a case where while the autonomous mobile body is traveling in the widthwise center of the travel lane on the way, if the outside recognition device detects no object present eccentrically toward one widthwise side of the travel lane, the controller does not generate a new route.

5. The route generation device according to claim 1, wherein the controller updates the cost map by gradually increasing the value of cost in accordance with a distance from the object.

6. The route generation device according to claim 1, wherein in response to the object is present eccentrically toward one widthwise side of the road, the controller causes the autonomous mobile body to travel in a center between a grid cell corresponding to an edge zone of the road toward the other widthwise side and an edge of the object facing the other widthwise side.

* * * * *